United States Patent
Oesterling

(10) Patent No.: US 11,434,684 B2
(45) Date of Patent: Sep. 6, 2022

(54) APPARATUS AND METHOD TO PROVIDE ACCESS TO SHARED VEHICLES WITHOUT POWER LOCKS

(71) Applicant: General Motors LLC, Detroit, MI (US)

(72) Inventor: Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 139 days.

(21) Appl. No.: 16/822,152

(22) Filed: Mar. 18, 2020

(65) Prior Publication Data
US 2021/0293075 A1    Sep. 23, 2021

(51) Int. Cl.
| | | |
|---|---|---|
| *H04B 7/00* | (2006.01) | |
| *E05F 15/77* | (2015.01) | |
| *G06Q 50/30* | (2012.01) | |
| *H04W 12/00* | (2021.01) | |
| *B60K 31/00* | (2006.01) | |
| *H04W 4/40* | (2018.01) | |
| *G08B 13/14* | (2006.01) | |
| *H04W 4/80* | (2018.01) | |
| *H04W 12/43* | (2021.01) | |

(52) U.S. Cl.
CPC .......... *E05F 15/77* (2015.01); *B60K 31/0058* (2013.01); *G06Q 50/30* (2013.01); *G08B 13/1418* (2013.01); *H04W 4/40* (2018.02); *H04W 4/80* (2018.02); *H04W 12/009* (2019.01); *H04W 12/43* (2021.01); *E05Y 2400/45* (2013.01); *E05Y 2400/85* (2013.01); *E05Y 2900/53* (2013.01); *G06Q 2240/00* (2013.01)

(58) Field of Classification Search
CPC .. E05F 15/77; E05Y 2400/45; E05Y 2400/85; E05Y 2900/53; G06Q 2240/00; G06Q 50/30; B60K 13/1418; H04W 12/43; H04W 12/009; H04W 4/80; H04W 4/40
USPC .......................................................... 49/14
See application file for complete search history.

(56) References Cited

U.S. PATENT DOCUMENTS

| | | | | |
|---|---|---|---|---|
| 5,528,998 A * | 6/1996 | Smith | ............... | E05B 19/0005 109/34 |
| 5,947,038 A * | 9/1999 | Smith | ............... | E05B 19/0005 40/202 |
| 10,356,550 B2 * | 7/2019 | Smith | ............... | H04W 84/18 |
| 2003/0115148 A1 * | 6/2003 | Takhar | ............... | G06Q 20/382 705/64 |
| 2003/0179075 A1 * | 9/2003 | Greenman | ............... | G07C 9/215 340/5.73 |
| 2004/0243463 A1 * | 12/2004 | Wells | ............... | G06Q 30/02 705/14.48 |

(Continued)

*Primary Examiner* — April G Gonzales

(57) ABSTRACT

A vehicle sharing system for use with a vehicle. The vehicle sharing system comprises: i) a lockbox mounted on an exterior of the vehicle, the lockbox including a vehicle key that opens a door of the vehicle; and ii) a vehicle sharing control module disposed in the interior of the vehicle. The vehicle sharing control module communicates with the lockbox in order to open a door associated with the lockbox in response to a first command message received from a mobile device associated with a user. The lockbox is mounted on a license plate holder of the vehicle and the license plate is mounted on the door of the lockbox.

10 Claims, 4 Drawing Sheets

(56) References Cited

U.S. PATENT DOCUMENTS

| | | | |
|---|---|---|---|
| 2005/0087575 A1* | 4/2005 | Samsel | B62J 9/10 224/413 |
| 2009/0163140 A1* | 6/2009 | Packham | H04L 67/02 455/557 |
| 2010/0228666 A1* | 9/2010 | Laskowski | G06Q 20/40 109/73 |
| 2010/0275530 A1* | 11/2010 | Laskowski | E04H 6/10 362/147 |
| 2011/0191126 A1* | 8/2011 | Hampshire | G06Q 10/02 705/5 |
| 2013/0237193 A1* | 9/2013 | Dumas | G07C 9/00571 455/414.1 |
| 2016/0050515 A1* | 2/2016 | Johnson | H04W 4/029 455/41.2 |
| 2016/0292560 A1* | 10/2016 | Ayatollahi | H01Q 1/243 |
| 2017/0206475 A1* | 7/2017 | Shoen | G06Q 30/0645 |
| 2018/0213355 A1* | 7/2018 | Smith | H01Q 1/3291 |
| 2019/0152405 A1* | 5/2019 | Mohr | E05B 19/0005 |
| 2019/0297454 A1* | 9/2019 | Smith | G01S 3/72 |
| 2020/0031298 A1* | 1/2020 | Takeuchi | G08B 25/08 |
| 2020/0128354 A1* | 4/2020 | Smith | G01S 5/0289 |
| 2020/0276981 A1* | 9/2020 | Anderson | B60W 50/12 |

* cited by examiner

APPARATUS AND METHOD TO PROVIDE ACCESS TO SHARED VEHICLES WITHOUT POWER LOCKS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system and method to add support for non-power lock vehicles in the vehicle sharing business.

A vehicle sharing control (VSC) module is an aftermarket device installed in a vehicle to support vehicle-sharing services. The VSC module wirelessly communicates with, for example, a vehicle-sharing application on a mobile phone. The VSC module allows the user of the mobile phone to access the vehicle by, for example, remotely unlocking the door so the user may then drive the shared vehicle. Typically, the VSC module unlocks the vehicle door via two primary methods. The VSC module may send a "Door Unlock" command over the internal vehicle bus to the door control module. Alternatively, the VSC module may comprise an actual key fob circuit board that uses radio frequencies to unlock the vehicle door in the same manner as a handheld key fob circuit.

However, many vehicles do not have power locks, particularly rental trucks and older vehicles.

SUMMARY

Further areas of applicability of the present disclosure will become apparent from the detailed description, the claims and the drawings. The detailed description and specific examples are intended for purposes of illustration only and are not intended to limit the scope of the disclosure.

According to one aspect of the present disclosure, there is provided a vehicle sharing system for use with a vehicle. The vehicle sharing system comprises: i) a lockbox mounted on an exterior of the vehicle, the lockbox including a vehicle key that opens a door of the vehicle; and ii) a vehicle sharing control module disposed in the interior of the vehicle. The vehicle sharing control module communicates with the lockbox in order to open a door associated with the lockbox in response to a first command message received from a mobile device associated with a user.

In one embodiment, the lockbox is mounted on a license plate holder of the vehicle and the license plate is mounted on the door of the lockbox.

In another embodiment, the vehicle sharing control module comprises a first transceiver configured to communicate with a remote server.

In still another embodiment, the vehicle sharing control module further comprises a second transceiver configured to communicate with the mobile device associated with the user.

In yet another embodiment, the second transceiver is further configured to communicate with a third transceiver associated with the lockbox.

In a further embodiment, the first transceiver of the vehicle sharing control module comprises a cellular transceiver and the second and third transceivers comprise Bluetooth low energy (BLE) transceivers.

In a still further embodiment, the second transceiver broadcasts a hash value based on a hash function of the vehicle identification number of the vehicle.

In a yet further embodiment, the mobile device of the user detects the broadcasted hash value and, in response, transmits to the second transceiver the first command message.

In another embodiment, the second transceiver receives the first command and in response transmits to the lockbox a second command message that causes the lockbox to open the door associated with the lockbox.

In yet another embodiment, the vehicle sharing control module is further configured to detect an alert condition associated with the lockbox, the alert condition indicating potential theft or malfunctioning of the lockbox and, in response, to transmit an alert message to the remote server.

It is another aspect of the present disclosure to provide a method for use in vehicle sharing system. The method comprises: i) receiving in a vehicle sharing control module disposed in the interior of the vehicle a first command message transmitted by a mobile device associated with a user; ii) in response to receipt of the first command message, transmitting from the vehicle sharing control module a second command message; iii) receiving the second command message in a lockbox mounted on an exterior of the vehicle, the lockbox including a vehicle key that opens a door of the vehicle; and iv) in response to receipt of the second command message, opening a door associated with the lockbox.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The apparatus and method disclosed herein provide support for non-power lock vehicles to be used in the vehicle-sharing business. The disclosed apparatus comprises a secure lockbox installed on the exterior of the vehicle and easily accessible by the user of the mobile phone. The lockbox contains a physical key that opens the doors of the vehicle. In an advantageous embodiment, the secure lockbox is installed behind the license plate, which is mounted on the outer surface of the door of the lockbox. The lockbox door is remotely opened when the user mobile phone is proximate the vehicle, such that the lockbox door (and attached license plate) swing open—revealing the vehicle door key secured inside the lockbox. Alternatively, the lockbox may be installed out of view on another surface of the vehicle, such as mounting on the bottom surface of the gas tank using a strong epoxy bond.

The disclosed apparatus also provides theft and tampering detection with backend notifications. The VSC module has access to the internal vehicle bus access in order to obtain VIN data. The VSC module is configured to confirm when the door key is returned to the lockbox at the end of the vehicle-sharing reservation. The disclosed VSC module and lockbox are simple to install on any vehicle. No vehicle integration is required. The lockbox may be powered by a disposable battery or may receive power from a power and ground connection to the battery of the vehicle.

Figure 1:
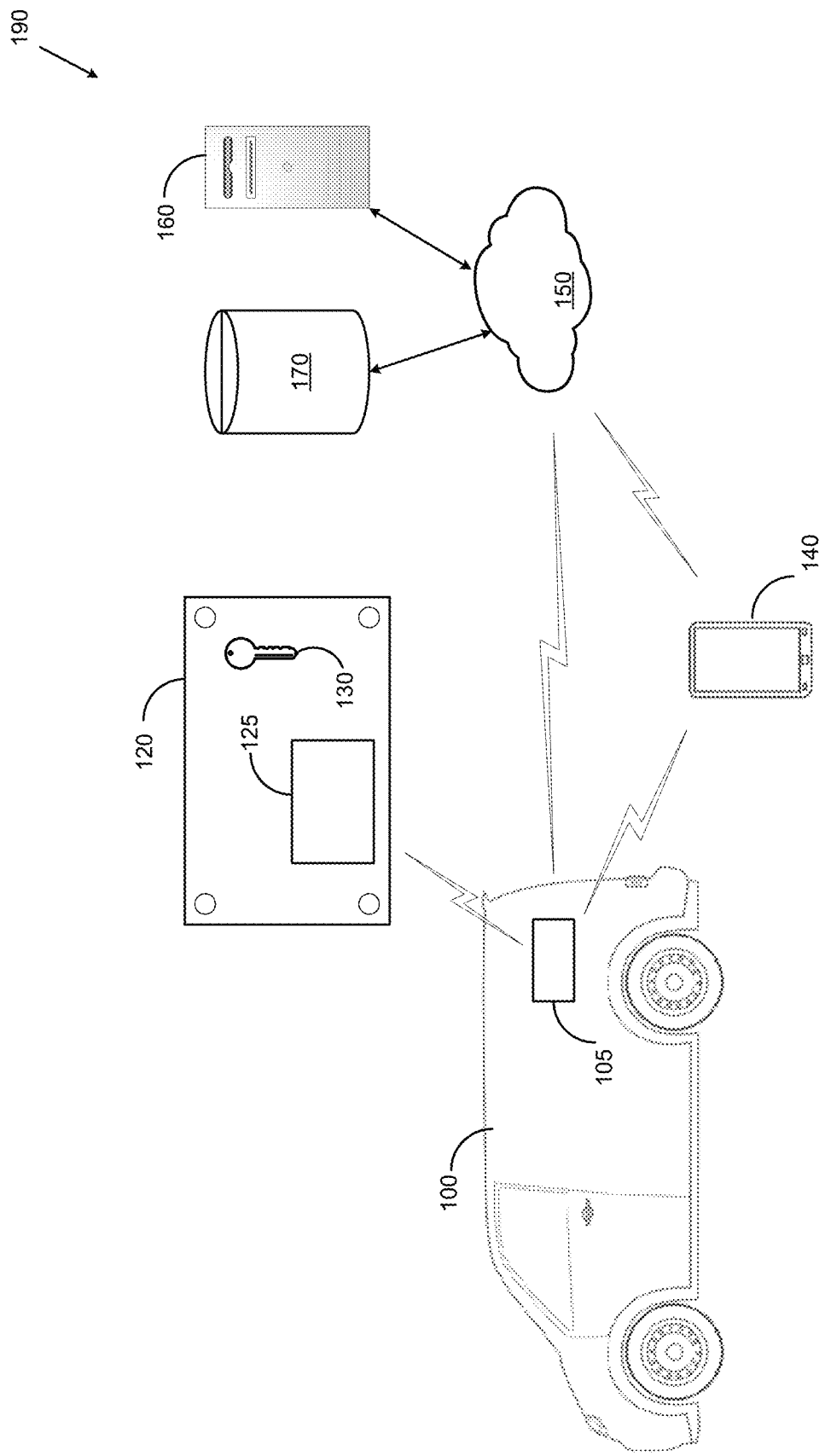
FIG. 1 illustrates a vehicle sharing system that provides support for vehicles that lack power locks according to an embodiment of the present disclosure.

FIG. 1 illustrates a vehicle sharing system 190 that provides support for a no-power lock vehicle 100 according to an embodiment of the present disclosure. The vehicle sharing system 190 comprises a vehicle sharing control (VSC) module 105, a license plate lockbox 120, a vehicle sharing system (VSS) server 160, and a vehicle sharing customer database (DB) 170. A user can make a reservation for a shared vehicle by using a mobile phone 140 to access the VSS server 160 over a wireless internet protocol (IP) network 150.

In FIG. 1, the license plate lockbox 120 is hidden between the license plate holder that is attached to the vehicle 100 and the license plate. The four circles in the corners of the lockbox 120 indicate boltholes that allow the license plate lockbox 120 to be mounted to the license plate holder. The door (not shown) of the license plate lockbox 120 contains similar holes that allow the license plate to be mounted to the door of the license plate lockbox 120. In an exemplary embodiment, the door of the license plate lockbox 120 is coupled to the main body of the license plate lockbox 120 by spring-mounted hinges that allow the door to swing open once the lock of the license plate lockbox 120 is unlocked.

The lockbox 120 includes a lockbox access control (LAC) module 125 and a physical door key 130. The VSC module 105 has both cellular communication and Bluetooth low energy (BLE) communication capability. The VSC module 105 is configured to communicate over the cellular communication link with the VSS server 160 via the wireless IP network 150. The VSC module 105 is further configured to communicate over the BLE link with the LAC module 125 and the mobile phone 140.

The user initiates a vehicle sharing reservation by accessing the VSS server 160 using an app on the mobile phone 140. The vehicle sharing service is typically available as a subscription service. It is assumed herein that the user has already subscribed to the vehicle sharing service and has created a subscriber record that is stored in database (DB) 170. The individual subscriber record typically stores the user payment information (e.g., credit card data, debit card data, etc.), subscriber identification (e.g., name, address, DOB), subscriber driver license data, vehicle preference, and the like.

The mobile phone 140 communicates over the BLE link with the VSC module 105 during an active reservation session. The user mobile phone 140 transmits a secure Open Lockbox command to the VSC module 105 via an internal Bluetooth low energy (BLE) transceiver. The VSC module 105 then sends over a secure BLE connection an Open command to the lockbox 120, which opens the door of the lockbox 120. The user then retrieves the key 130, opens the door of the vehicle 100, and begins to drive.

In one embodiment, after the VSC module 105 sends the Open command to the lockbox 120, the VSC module 105 also transmits to the VSS server 160 a message indicating that lockbox 120 has been opened. In response, the VSS server 160 transmits to the vehicle 100 a command that lifts an ignition block condition that prevents theft.

At the end of the vehicle sharing reservation, the user parks the vehicle 100 and locks the doors. The VSC module 105 prompts the user to return the key 130 to the license plate lockbox 120. Once the user returns the key 130 and closes the lockbox 120, the VSC module 105 sends a message to VSS server 160 indicating the key 130 has been returned to the lockbox 120. In response, the VSS server 160 transmits to the vehicle 100 a command that activates an ignition block condition to prevent theft.

In an advantageous embodiment, the key 130 includes a BLE tag that confirms the key 130 has been returned to the lockbox 120 at the end of reservation. The BLE tag allows detection of the key 130 by the lockbox access control (LAC) module 125. The LAC module 125 transmits this information to the VSC module 105, which relays this information to the VSS server 160.

Figure 2:
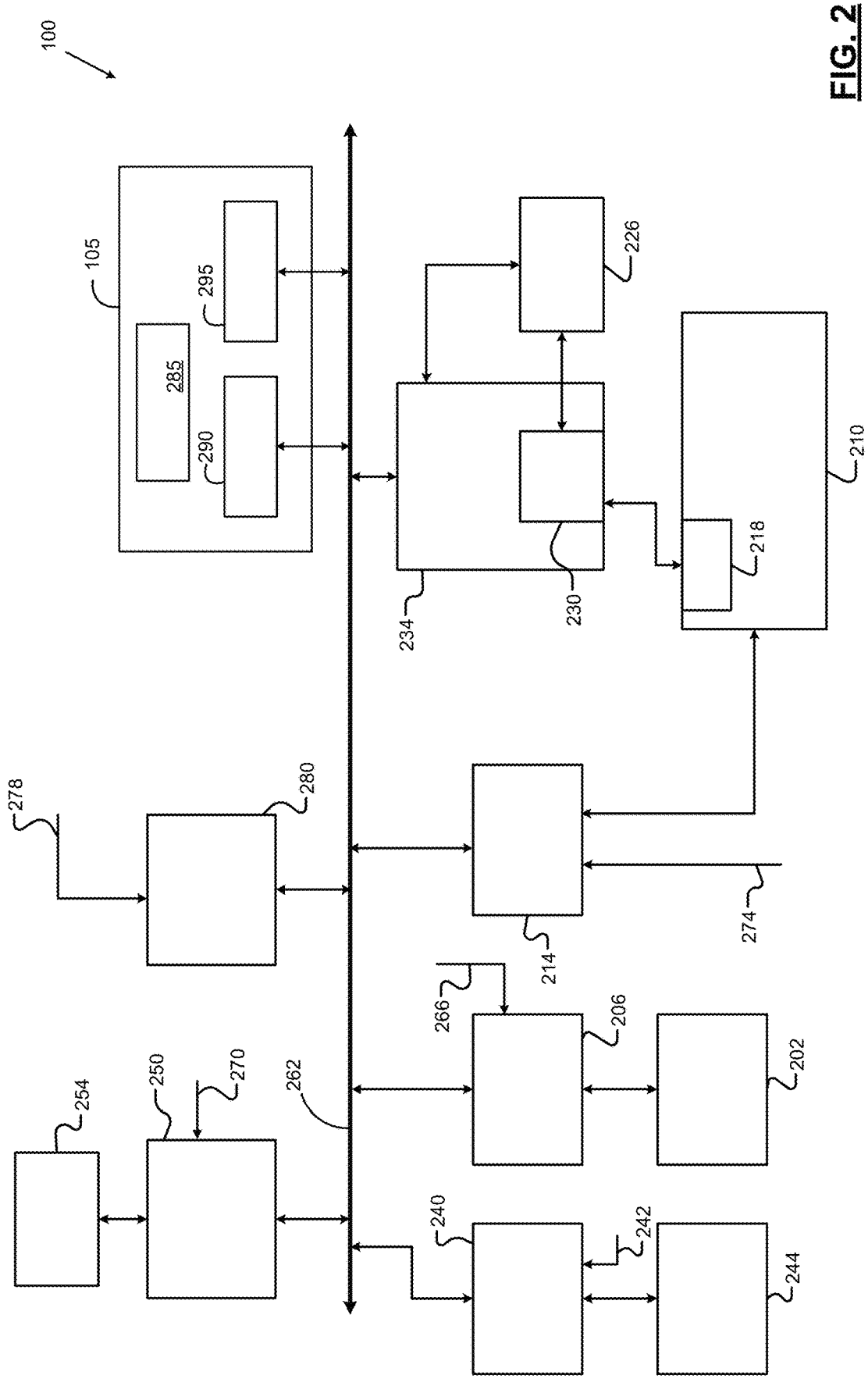
FIG. 2 is a block diagram of an exemplary vehicle engine system and an exemplary vehicle sharing control module according to an embodiment of the present disclosure.

FIG. 2 is a functional block diagram of an exemplary vehicle engine system and exemplary vehicle sharing control (VSC) module 105 according to an embodiment of the present disclosure. While a VSC module 105 implemented in a hybrid vehicle is shown and described herein, the present disclosure is also applicable to all-electric vehicles, fuel cell vehicles, autonomous vehicles, non-electric vehicles, and other types of trucks, vans, sedans, and motorcycles. Furthermore, while an example of a vehicle is provided, the present application is also applicable to non-vehicle implementations, such as boats and aircraft.

An engine 202 combusts an air/fuel mixture to generate drive torque. An engine control module (ECM) 206 controls the engine 202 based on one or more driver inputs. For example, the ECM 206 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 202 may output torque to a transmission 210. A transmission control module (TCM) 214 controls operation of the transmission 210. For example, the TCM 214 may control gear selection within the transmission 210 and one or more torque transfer devices (e.g., a torque converter, one or more clutches, etc.).

The vehicle system may include one or more electric motors. For example, an electric motor 218 may be implemented within the transmission 210 as shown in the example of FIG. 1. An electric motor can act as either a generator or as a motor at a given time. When acting as a generator, an electric motor converts mechanical energy into electrical energy. The electrical energy can be, for example, used to charge a battery 226 via a power control device (PCD) 230. When acting as a motor, an electric motor generates torque that may be used, for example, to supplement or replace torque output by the engine 202. While the example of one electric motor is provided, the vehicle may include zero or more than one electric motor.

A power inverter control module (PIM) 234 may control the electric motor 218 and the PCD 230. The PCD 230 applies (e.g., direct current) power from the battery 226 to the (e.g., alternating current) electric motor 218 based on signals from the PIM 234, and the PCD 230 provides power output by the electric motor 218, for example, to the battery 226. The PIM 234 may be referred to as a power inverter module (PIM) in various implementations.

A steering control module 240 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 242 based on the position of the steering wheel. As an example, the steering control module 240 may control vehicle steering via an EPS motor 244 based on the SWA 242. However, the vehicle may include another type of steering system. An electronic brake control module (EBCM) 250 may selectively control brakes 254 of the vehicle.

Modules of the vehicle may share parameters via a controller area network (CAN) 262. The CAN 262 may also be referred to as a car area network. For example, the CAN 262 may include one or more data buses. Various parameters may be made available by a given control module to other control modules via the CAN 262.

The driver inputs may include, for example, an accelerator pedal position (APP) 266 that may be provided to the ECM 206. A brake pedal position (BPP) 270 may be provided to the EBCM 250. A position 274 of a park, reverse, neutral, drive lever (PRNDL) may be provided to the TCM 214. An ignition state 278 may be provided to a body control module (BCM) 280. For example, the ignition state 278 may be input by a driver via an ignition key, button, or switch. At a given time, the ignition state 278 may be one of off, accessory, run, or crank.

The CAN 262 is also coupled to the vehicle sharing control (VSC) module 105. It is noted that the VSC module 105 is installed as an aftermarket device. In an advantageous embodiment, the CAN 262 is typically accessible in the passenger compartment and the VSC module 105 may be installed in a concealed spot, such as below the dashboard or inside the glove compartment.

The VSC module 105 comprises a vehicle access control (VAC) module 285, a mobile transceiver 290, and a Bluetooth low energy (BLE) transceiver 295. The mobile transceiver 290 enables the VSC module 105 to communicate over the cellular communication link with the VSS server 160 via the wireless IP network 150. The BLE transceiver 295 enables the VSC module 105 to communicate with the lockbox access control (LAC) module 125 and the mobile phone 140.

The vehicle access control (VAC) module 285 comprises a processor and memory containing the computer code that the processor executes in order to control the overall operation of the VSC module 105. The VAC module 285 causes the BLE transceiver 295 to broadcast (or advertise) the presence of the BLE transceiver by transmitting a hash value derived from a hash function of the vehicle identification number (VIN) of the vehicle 100. The mobile phone 140 detects the transmission of the hash value based on the VIN and initiates a Bluetooth link with the VAC module 285 via the BLE transceiver 295.

The vehicle access control (VAC) module 285 also causes the BLE transceiver 295 to transmit Open Door commands to the lockbox access control (LAC) module 125 in lockbox 120. Similarly, the VAC module 285 receives from the BLE transceiver 295 information transmitted from the LAC module 125, such as a message indicating that the key 130 has been returned to the lockbox 120.

Figure 3:
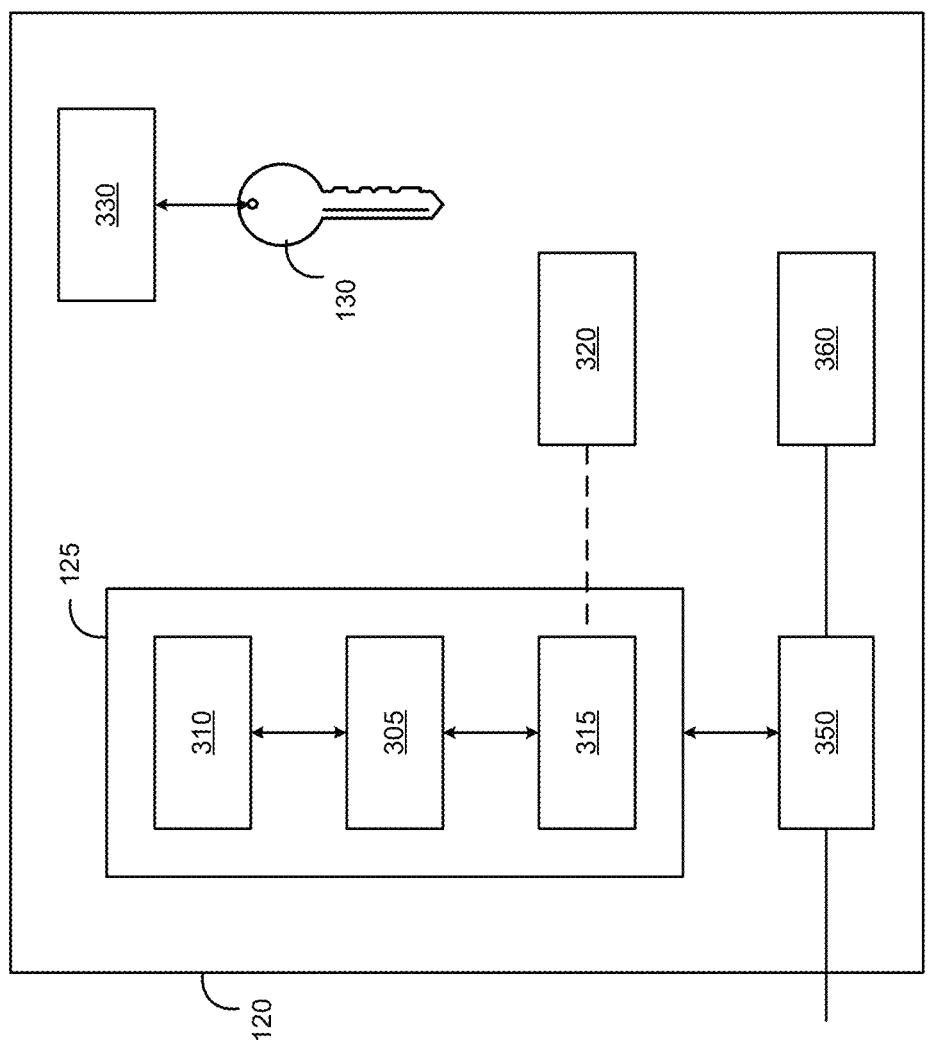
FIG. 3 illustrates an exemplary license plate lockbox according to an embodiment of the present disclosure.

FIG. 3 illustrates an exemplary license plate lockbox 120 in detail according to an embodiment of the present disclosure. The license plate lockbox 120 comprises the lockbox access control (LAC) module 125, the key 130, a key fob 330 associated with the key 130, a lockbox lock 320, a power management module 350, and a replaceable battery 360. The power management module 350 applies power to the LAC module 125. In an exemplary embodiment of the present disclosure, the power management module 350 receives power from one or both of the battery 360 and (if present) connections (+12 VDC and ground) to the battery of the vehicle 100. The lockbox lock 320 may be an electromechanical latch or a magnetic lock that locks the door of the lockbox 120 to the body of the lockbox 120.

The lockbox access control (LAC) module 125 comprises an access control module 305, a BLE transceiver 310, and a lock actuator module 315. The access control module 305 comprises a processor and memory containing the computer code that the processor executes in order to control the overall operation of the LAC module 125. The access control module 305 causes the BLE transceiver 310 to communicate with the mobile phone 140 and the VSC module 105. The access control module 305 also causes the lock actuator module 315 to open and close the lockbox lock 320.

Figure 4:
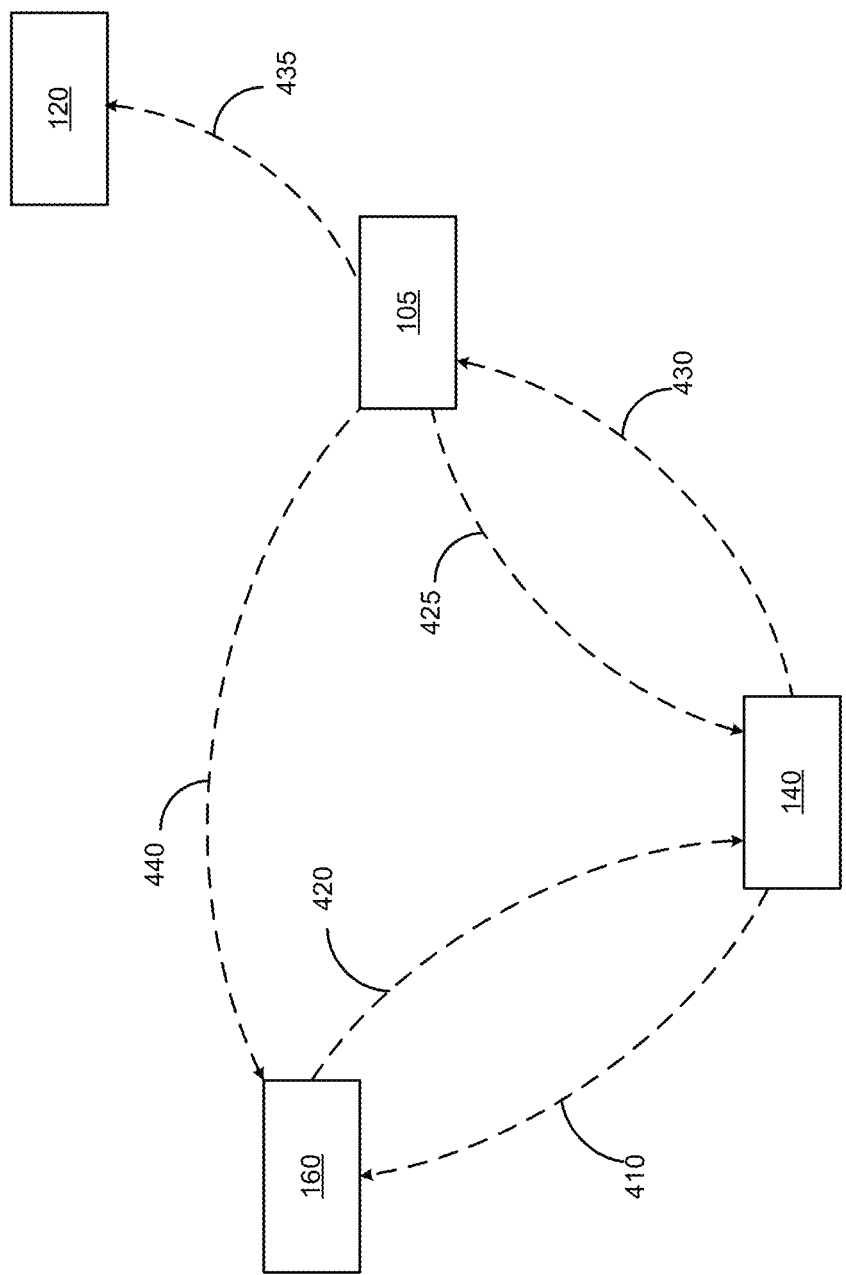
FIG. 4 is a flow diagram illustrating the operation of a vehicle sharing system according to an embodiment of the present disclosure.

FIG. 4 is a flow diagram illustrating the operation of the vehicle sharing system according to an embodiment of the present disclosure. Initially, in 410, the app in the mobile phone 140 initiates an authentication (AUTH) process with the vehicle sharing system (VSS) server 160 in order to reserve a shared vehicle. At the end of the authentication process, in 420, the server 160 transmits to the mobile phone 140 data that includes a hash value based on a hash function of the VIN of the vehicle 100, the location (e.g., GPS coordinates) of the vehicle 100, and a secure (encrypted) OPEN command that opens the door of the vehicle 100.

Thereafter, the user of the mobile phone 140 moves to the location of the vehicle 100. In 425, the BLE transceiver 295 of the VSC module 105 periodically transmits the hash value based on the hash function of the VIN of the vehicle 100. When the mobile phone 140 is within range of the VSC module 105, the Bluetooth transceiver in the mobile phone 140 will detect the VIN hash value transmitted by the VSC module 105 will compare it to the VIN hash value that the mobile phone 140 received in 420 from the server 160. When a match occurs, in 430 the mobile phone 140 will transit to the VSC module 105 the secure OPEN command that the mobile phone 140 received in 420 from the server 160.

In response, in 435, the Bluetooth transceiver 295 in the VSC module 105 will transmit an encrypted OPEN Lockbox command to the BLE transceiver 310 in the lockbox access control module 125 in lockbox 120. At that point, the access control module 305 will activate the lock actuator module 315 to open lockbox lock 320. The user of the mobile phone 140 may then retrieve the key 130 and drive the vehicle 100. When the user of the mobile phone 140 finishes driving and returns the key 130 to the lockbox 120, in 440, the mobile transceiver 290 in the VSC module 105 will transmit a Key Returned message to the server 160, which will end the reservation.

It is possible that the lockbox 120 may be removed illegally from the vehicle 100 or the door to the lockbox 120 may be forced open. The disclosed vehicle sharing system provides several capabilities for detecting such theft and tampering. In a first method, the VSC module 105 may transmit a periodic "ping" signal to the LAC module 125, which in turn responds with an acknowledgement signal. If the VSC module 105 fails to receive an acknowledgment signal, the VSC module 105 may transmit an alert message to the server 160 indicating that the lockbox 120 may have been stolen or is no longer functioning. In a second method, the LAC module 125 may independently broadcast an advertisement message to the VSC module 105. If the VSC module 105 fails to receive the advertisement message for a defined period, the VSC module 105 may transmit an alert message to the server 160.

In a third method, if the lockbox 120 is removed from the vehicle 100, the power management module 350 will detect that the connection to the vehicle battery has been lost and will send an alert signal to the LAC module 125. The LAC module 125 responds by transmitting an alert signal to the VSC module 125, which in turn transmits an alert message to the server 160 indicating that lockbox 120 may have been stolen or is no longer functioning. Finally, in an advantageous embodiment, the LAC module 125 detects when the door to the lockbox 120 is open and transmits this status information to the VSC module 125. If the door to the lockbox 120 is open, but there is no active reservation, the VSC module 125 transmits an alert message to the server 160 indicating that lockbox 120 may have been stolen or is no longer functioning.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle sharing system for use with a vehicle, the vehicle sharing system comprising:
a lockbox mounted on an exterior of the vehicle, the lockbox including a vehicle key that opens a door of the vehicle; and
a vehicle sharing control module disposed in the interior of the vehicle, the vehicle sharing control module configured to communicate with the lockbox and to open a door of the lockbox in response to a first command message received from a mobile device associated with a user,
wherein the vehicle sharing control module comprises:
a first transceiver configured to communicate with a remote server, wherein the first transceiver comprises a cellular transceiver; and
a second transceiver configured to communicate with the mobile device associated with the user and to communicate with a third transceiver associated with the lockbox, wherein the second and third transceivers comprise Bluetooth low energy (BLE) transceivers, and
wherein the second transceiver is configured to broadcast a hash value based on a hash function of the vehicle identification number of the vehicle.

2. The vehicle sharing system as set forth in claim 1, wherein the lockbox is mounted on a license plate holder of the vehicle and a license plate is mounted on the door of the lockbox.

3. The vehicle sharing system as set forth in claim 1, wherein the mobile device of the user detects the broadcasted hash value and, in response, transmits to the second transceiver the first command message.

4. The vehicle sharing system as set forth in claim 3, wherein the second transceiver receives the first command message and in response transmits to the lockbox a second command message that causes the lockbox to open the door of the lockbox.

5. The vehicle sharing system as set forth in claim 1, wherein the vehicle sharing control module is further configured to detect an alert condition associated with the lockbox, the alert condition indicating potential theft or malfunctioning of the lockbox and, in response, to transmit an alert message to the remote server.

6. A method for use in vehicle sharing system, the method comprising:
receiving in a vehicle sharing control module disposed in the interior of the vehicle a first command message transmitted by a mobile device associated with a user;
in response to receipt of the first command message, transmitting from the vehicle sharing control module a second command message;
receiving the second command message in a lockbox mounted on an exterior of the vehicle, the lockbox including a vehicle key that opens a door of the vehicle;
in response to receipt of the second command message, opening a door of the lockbox,
wherein the vehicle sharing control module comprises:
a first transceiver configured to communicate with a remote server, wherein the first transceiver comprises a cellular transceiver; and
a second transceiver configured to communicate with the mobile device associated with the user and to communicate with a third transceiver associated with the lockbox, wherein the second and third transceivers comprise Bluetooth low energy (BLE) transceivers, and
wherein the second transceiver is configured to broadcast a hash value based on a hash function of the vehicle identification number of the vehicle.

7. The method as set forth in claim 6, wherein the lockbox is mounted on a license plate holder of the vehicle and a license plate is mounted on the door of the lockbox.

8. The method as set forth in claim 6, wherein the mobile device of the user detects the broadcasted hash value and, in response, transmits to the second transceiver the first command message.

9. The method as set forth in claim 8, wherein the second transceiver receives the first command message and in response transmits to the lockbox a second command message.

10. The method as set forth in claim 6, further comprising detecting in the vehicle sharing control module an alert condition associated with the lockbox, the alert condition indicating potential theft or malfunctioning of the lockbox and, in response, transmitting an alert message to the remote server.

* * * * *